(12) United States Patent
Zinkovsky et al.

(10) Patent No.: US 8,997,040 B2
(45) Date of Patent: Mar. 31, 2015

(54) VARIABLE CLOSURE

(75) Inventors: Igor Zinkovsky, Redmond, WA (US); Harish Kantamneni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1038 days.

(21) Appl. No.: 12/730,263

(22) Filed: Mar. 24, 2010

(65) Prior Publication Data

US 2011/0239186 A1    Sep. 29, 2011

(51) Int. Cl.
    *G06F 9/44* (2006.01)
    *G06F 3/00* (2006.01)
    *G06F 9/455* (2006.01)

(52) U.S. Cl.
    CPC .................................. *G06F 9/45516* (2013.01)
    USPC ........... 717/107; 717/104; 717/105; 717/106; 719/316

(58) Field of Classification Search
    None
    See application file for complete search history.

(56) References Cited

U.S. PATENT DOCUMENTS

| | | | |
|---|---|---|---|
| 4,989,132 A | 1/1991 | Mellender et al. | |
| 5,590,332 A | 12/1996 | Baker | |
| 5,815,711 A * | 9/1998 | Sakamoto et al. | 717/105 |
| 6,199,201 B1 * | 3/2001 | Lamping et al. | 717/114 |
| 6,427,231 B1 * | 7/2002 | Burke et al. | 717/116 |
| 6,675,378 B1 | 1/2004 | Schmidt | |
| 7,526,750 B2 * | 4/2009 | Andrews et al. | 717/104 |
| 7,526,771 B2 * | 4/2009 | Roman et al. | 719/316 |
| 8,527,943 B1 * | 9/2013 | Chiluvuri | 717/107 |
| 2004/0031015 A1 * | 2/2004 | Ben-Romdhane et al. | 717/107 |
| 2004/0078789 A1 * | 4/2004 | Ghiya et al. | 717/152 |
| 2007/0044083 A1 * | 2/2007 | Meijer et al. | 717/151 |
| 2008/0244516 A1 * | 10/2008 | Meijer et al. | 717/116 |
| 2008/0320440 A1 * | 12/2008 | Meijer et al. | 717/108 |
| 2009/0327372 A1 | 12/2009 | Ylonen | |
| 2010/0131921 A1 * | 5/2010 | Dyer et al. | 717/107 |
| 2011/0258594 A1 * | 10/2011 | Syme et al. | 717/106 |

FOREIGN PATENT DOCUMENTS

CN            101192149 A       6/2008

OTHER PUBLICATIONS

Jeffrey Mark Siskind, "Flow-Directed Lightweight Closure Conversion" [Online], Jan. 2001, pp. 1-32, [Retrieved from Internet on Nov. 18, 2012], <ftp://ftp.ecn.purdue.edu/qobi/99-105.pdf>.*

(Continued)

*Primary Examiner* — Thuy Dao
*Assistant Examiner* — Ziaul A Chowdhury
(74) *Attorney, Agent, or Firm* — Kevin Sullivan; Kate Drakos; Micky Minhas

(57) ABSTRACT

A system and method for accessing closure variables from a lambda expression in certain program configurations, in which the closure variable is accessed while the closure function is active and the closure variable is within an active runtime frame stack corresponding to an instance of the closure function. In response to entering the closure function, a pointer to each closure variable is stored in a stack pointer table. Each reference to each closure variable from the lambda expression is handled by using the closure variable pointer to locate the closure variable on the runtime stack. Program code may be instrumented to insert invocations to helper functions at locations upon entering the closure function and at each reference to each closure variable from the lambda expression.

20 Claims, 6 Drawing Sheets

(56) References Cited

OTHER PUBLICATIONS

Kent Dybvig R., "Three Implementation Models for Scheme", [Online], 1987, pp. 1-172, [Retrieved from Internet on Nov. 19, 2012], <http://www.cs.indiana.edu/~dyb/papers/3imp.pdf>.*

Luca Cardelli, "Compiling a Functional Language", [Online], Jun. 1995, pp. 1-16, [Retrieved from Internet on Jun. 20, 2013], <http://citeseerx.ist.psu.edu/viewdoc/download?doi=10.1.1.35.6169&rep=rep1&type=pdf>.*

Jeremiah Willcock et al. "Lambda expressions and closures for C++", [Online], 2006, pp. 1-14, [Retrieved from Internet on Nov. 10, 2014], <http://faculty.cse.tamu.edu/jarvi/papers/n1968.pdf>.*

Jaakko J arvi et al., "Lambda Functions for C++0x", [Online], ACM 2008, pp. 178-183, [Retrieved from Internet on Nov. 10, 2014], <http://delivery.acm.org/10.1145/1370000/1363735/p178-jarvi.pdf>.*

William D Clinger, "Proper Tail Recursion and Space Efficiency", [Online], ACM 1998, pp. 174-185, [Retrieved from Internet on Nov. 10, 2014], <http://delivery.acm.org/10.1145/280000/277719/p174-clinger.pdf>.*

Bruno Blanchet, "Escape Analysis: Correctness Proof, Implementation: and Experiment al Results", [Online], ACM 1998, pp. 25-37, [Retrieved form Internet on Nov. 10, 2014], <http://delivery.acm.org/10.1145/270000/268949/p25-blanchet.pdf>.*

Rozas, Guillermo Juan, "Taming the Y operator", Retrieved at << http://citeseerx.ist.psu.edu/viewdoc/download;jsessionid=7CB40E402CD4C229168557833BE0A5CD?doi=10.1.1.29.6910&rep=rep1&type=pdf >>, Proceedings of the 1992 ACM conference on LISP and functional programming Conference on LISP and Functional Programming , 1992, pp. 9.

Rogers, Justin, "Understanding and Solving Internet Explorer Leak Patterns", Retrieved at << http://msdn.microsoft.com/en-us/library/bb250448.aspx >>, Jun. 2005, pp. 11.

"Function Pointers, Closures, and Lambda", Retrieved at << http://stackoverflow.com/questions/208835/function-pointers-closures-and-lambda >>, Jan. 9, 2009, pp. 4.

Kleeblatt, Dirk, "Checking Dependent Types Using Compiled Code", Retrieved at << http://user.cs.tu-berlin.de/~klee/Kleeblatt081FL.pdf >>, Implementation and Application of Functional Languages: 19th International Workshop, IFL 2007, Lecture Notes in Computer Science, Aug. 21, 2008, pp. 18.

Shao, et al., "Space-Efficient Closure Representations", Retrieved at << http://citeseerx.ist.psu.edu/viewdoc/download?doi=10.1.1.49.4146&rep=rep1&type=pdf >>,Proceedings of the 1994 ACM conference on LISP and functional programming Conference on LISP and Functional Programming , 1994, pp. 12.

"First Office Action and Search Report Received for Chinese Application No. 201110080598.6", Mailed Date: Dec. 29, 2014, 13 pages.

* cited by examiner

VARIABLE CLOSURE

BACKGROUND

Some computer programming languages include a concept known as closure. Closure is a way of capturing environmental elements, such as program variables, for subsequent use even though the original elements may have changed or no longer exist. For example, an inner function may refer to local variables defined within an outer function. The inner function may be assigned to a variable and invoked. Conceptually, the variables referred to by the inner function may be saved at the time of assignment, and these saved variables may be used during a subsequent invocation of the inner function. An implementation may save the variables in allocated heap memory, and deallocate the heap memory when it is no longer needed. Multiple invocations of the inner function reference the same copy of the saved variables. The inner function that refers to a local variable of the outer function is referred to as a lambda function, or simply, a lambda.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to access closure variables defined in a closure function of a computer program, when a reference to one of the closure variables is in a lambda expression within the closure function. The closure variables may be local to the closure function and stored in a stack frame on a runtime stack, the stack frame corresponding to an instance of the closure function. In response to entering the closure function, a pointer to each closure variable may be stored in a data structure, such as in heap memory or other type of memory. In response to an instruction to retrieve a value of the variable, the instruction in the lambda expression, the variable pointer may be used to locate the variable in the frame on the runtime stack, and to retrieve the variable value.

In one embodiment, in response to invoking an instance of the closure function, a closure object corresponding to the instance may be generated, the closure object including a pointer to the stack pointer.

In one embodiment, a computer program may be instrumented by parsing the program and inserting instructions to facilitate retrieving the closure variables. This may include inserting an instruction to create a closure object and store the variable pointers when the closure function is invoked. It may include inserting an instruction to retrieve the closure variable in response to a reference in a lambda expression. It may further include inserting an instruction to delete the closure object upon exiting the closure function.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
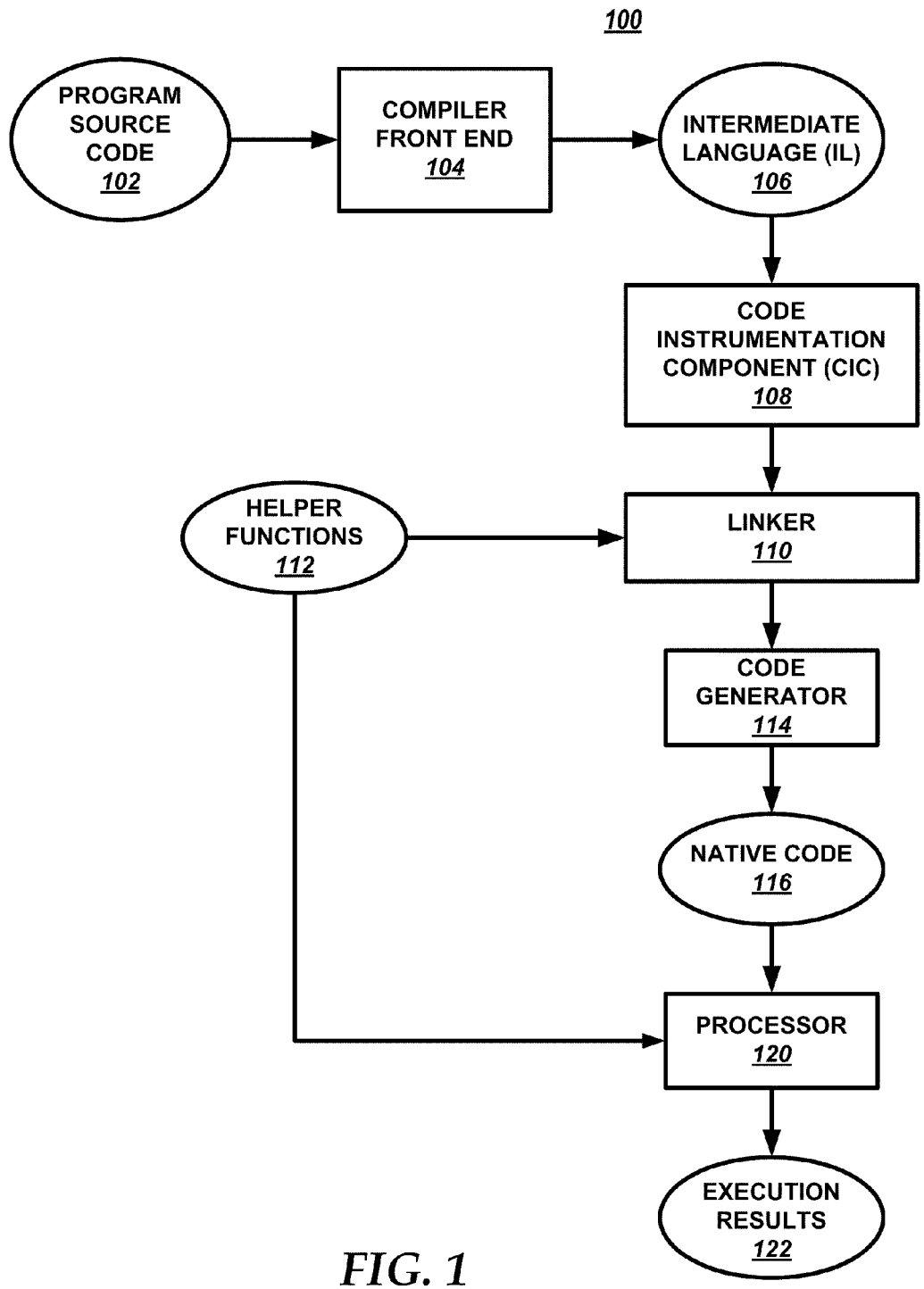
FIG. 1 is a block diagram of a computer system that may employ the mechanisms herein described.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data.

As used herein, the term "pointer" refers to a reference to a target physical or logical memory location, data structure, program instruction, or program segment. A pointer "points to" a target and may be used to locate or obtain the target. A pointer may be implemented in a variety of ways, including an address, an offset, an index, or an identifier.

As used herein, unless otherwise indicated by the context, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include all of these.

FIG. 1 is a block diagram of a computer system 100 in which mechanisms described herein may be implemented. FIG. 1 is only an example of a suitable system configuration and is not intended to suggest any limitation as to the scope of use or functionality of the present invention. Thus, a variety of system configurations may be employed without departing from the scope or spirit of the present invention.

As illustrated, system 100 includes program source code 102, which may be a high level language representation of a computer program. Examples of a high level language include F-Sharp (F#), Visual Basic, or various other high level languages. LINQ, which is a combination of a language and a library extension, is another example of program source code 102. A language that is compiled into an IL before being compiled into native code is sometimes referred to as a "managed language." A program may include one or more functions. A program may reside in one or more files or other storage representations. A program may include one or more libraries, which may be integrated or distributed in a variety of ways. Thus, program source code 102 may represent a program library or a portion thereof.

As illustrated, system 100 includes compiler front end 104. In one implementation, compiler front end includes a lexical analyzer, a syntax analyzer, and a semantic analyzer, though various other components or configurations may be employed. In one embodiment, compiler front end 104 processes program source code 102, translating it into an intermediate language module 106. In one implementation, intermediate language module 106 may represent the entire program source code 102 and include multiple functions, though it may include only a portion of the program source code 102 or a portion of a function. In one implementation, intermediate language module 106 is stored as one or more files. In one implementation, intermediate language module 106 includes a binary sequence of instructions, or a binary stream, that corresponds to program source code 102.

Though not illustrated, in one embodiment the system may include a run-time manager, which is a system component that manages execution of the computer program. In various configurations, a run-time manager may perform one or more of a number of actions, including loading program functions that are invoked by the execution of the computer program, translation of the program functions, locating and loading libraries or other resources employed by the program, or invocation or managing various program resources. A run-time manager may be referred to as implementing a system framework that provides various resources and services to the executing computer program.

In one configuration, a run-time manager includes a just-in-time (JIT) compiler or a portion thereof. Generally, a JIT compiler employs a mechanism in which an intermediate language representation of a program function is loaded and translated into a native language representation in response to its first invocation. For example, when a running program calls or invokes a function for the first time, in response to detecting the call the intermediate language representation of the function can be quickly compiled into native code and then run. The native language representation may be stored in memory so that the translation is not needed for subsequent invocations. One example of a run-time manager is the Common Language Runtime (CLR) component, by Microsoft Corporation, of Redmond, Wash. The CLR component employs an intermediate language representation known as the Common Intermediate Language (CIL). In one configuration, a JIT compiler of the run-time manager may translate the IL to native code immediately prior to execution, in response to detecting an invocation of the program or function. In one embodiment, a system may employ multiple processes, such that a JIT compiler may include a process that loads or translates a function concurrently with execution of execution of another function. The system may detect an invocation of a function prior to the execution of the invocation, so that at least a portion of the loading or translation is performed prior to the execution of the invocation. The term "detection" includes detection of an invocation, during runtime, prior to execution of the invocation. In one configuration, the run-time manager may translate the IL to native code prior to runtime.

As illustrated in FIG. 1, code instrumentation component (CIC) 108 may receive a function from IL module 106 and perform various transformations, such as inserting instructions in specific locations. Modifications may include adding, deleting, moving, or modifying program instructions. The process of inserting or modifying program instructions is referred to as "instrumentation." This process, and examples of such modifications, is described in further detail herein.

System 100 may include linker 110, which performs various operations of combining and linking program functions, modifying or inserting variable or function references, or the like. In one embodiment, linker 110 may retrieve one or more helper functions 112 and combine these functions with an intermediate language program to produce a linked program.

System 100 may include code generator 114, which translates an intermediate code representation into native code 116. Native code 116 may be a machine language, a virtual machine language, or another representation that may be executed by a physical or virtual processor. Processor 120 may receive native code 116 and execute program instructions, to produce execution results 122. In one configuration, processor 120 may include one or more central processing units, one or more processor cores, an ASIC, or other hardware processing component and related program logic. In one configuration, processor 120 may include a software component simulating a hardware processing unit. Processor 120 executes instructions in the native code 116.

Execution results 122 is a logical representation of the results of executing the native code 116. The results may include one or more of modifications to computer storage or computer memory, communication with other processes or computing devices, audio or video output, or control of various system or external components.

System 100 may be a subsystem of a development system. A development system may include one or more computing devices that are used by a program developer or a user as part of a program development, testing, or documentation process. The components of system 100 may be distributed among one or more computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like.

A computing device may be a special purpose or general purpose computing device. In brief, one embodiment of a computing device that may be employed includes one or more processing units, a memory, a display, keyboard and pointing device, and a communications interface. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system.

FIG. 1 is only an example of a suitable system and is not intended to suggest any limitation as to the scope of use or functionality of the present invention. Thus, a variety of system configurations may be employed without departing from the scope or spirit of the present invention. For example, CIC 108 or linker 110 may be combined with compiler front end 104. Some systems may translate directly into native code without an intermediate language. Various other configurations may be employed.

Table 1 includes a code snippet that illustrates an example of variable closure.

TABLE 1

Example Closure

| | |
|---|---|
| L100 | static void Main(string[ ] args) { |
| L101 | Func<int> lambda = FuncWithClosure( ); |
| L102 | int result = lambda( ); |
| L103 | } |
| L104 | static Func<int> FuncWithClosure( ) { |
| L105 | int varA = 100; |
| L106 | int varB = 200; |
| L107 | |
| L108 | Func<int> lambda = ( ) => { |
| L109 | return varA + varB; |
| L110 | }; |
| L111 | varA = 150; |
| L112 | return lambda; |
| L113 | } |

In this code snippet, each line is preceded by a line number with a suffix of "L" to avoid confusion with reference numbers used herein. In this example code snippet, a closure will be created that includes variables varA and varB of the outer function FuncWithClosure( ) An outer function may be referred to as a "closure function." Lines L108 to L110 create a lambda expression that is bound to the closure. More specifically, Lines L108 to L110 define a lambda function, which is one type of lambda expression. The term "lambda" refers to a lambda expression herein.

The lambda of Lines L108 to L110 uses the closure variables varA and varB. Statement L112 returns the lambda to the caller of FuncWithClosure( ) Statement L101 invokes the outer function, receiving a reference to the lambda created by the invocation. At statement L102, the lambda is invoked, returning the value of 350. In particular, it may be noted that the lambda uses the saved variable environment, and reflects the modification of local variable varA at line L111. The saved variable environment continues to exist even though the outer function FuncWithClosure( ) is no longer active at the time that the lambda is invoked at line L102.

In one implementation of closures, local variables of the outer function that are accessed by a lambda function are copied into a location within heap memory. References to these variables from the lambda function or the outer function are directed to the heap memory location. Local variables of the outer function that are accessed by a lambda function are referred to as "closed-over" variables. The terms "closed-over variable" and "closure variable" are synonymous and used interchangeably herein.

Table 2 includes an example source code snippet that illustrates another example of a closure. The example of Table 2 differs from Table 1 in that the lambda is invoked while the outer function is still active, and thus the local variables of the outer function, including closed-over variables, may still be in an active stack frame.

TABLE 2

Example Closure

| | |
|---|---|
| L200 | static void Main(string[ ] args) { |
| L201 | FuncWithClosure( ); |
| L202 | } |
| L203 | static void FuncWithClosure( ) { |

TABLE 2-continued

Example Closure

| | |
|---|---|
| L204 | int varA = 100; |
| L205 | int varB = 200; |
| L206 | |
| L207 | Func<int> lambda = ( ) => { |
| L208 | return varA + varB; |
| L209 | }; |
| L210 | varA = 150; |
| L211 | LambdaInvoker(lambda); |
| L212 | } |
| L213 | static void LambdaInvoker(Func<int> lambda) { |
| L214 | int result = lambda( ); |
| L215 | } |

In this example code snippet, a closure will be created that includes variables varA and varB of the outer function FuncWithClosure( ) Lines L207 to L209 create a lambda that will be bound to the closure. The lambda uses the variables varA and varB. Statement L210 modifies varA after the lambda is created. Statement L201 invokes the outer function. Statement L211 invokes a function LambdaInvoker( ) passing it the lambda. Statement L214, within LambdaInvoker( ) invokes the lambda, which references the modified value of varA and returns the value of 350. In this code snippet, at the time that the lambda is invoked at statement L214, the outer function FuncWithClosure is active with an active frame on the run-time stack.

It is to be noted that in this code snippet, the lambda function and the outer function both reference the same varA. Thus, a change to varA by the outer function results in the changed value being used by the lambda function.

Table 3 includes an example code snippet that illustrates mechanisms used to implement a closure of the code snippet in Table 2. In Table 3, instructions are inserted or modified to implement a variable closure in which the closed elements remain on the runtime stack. It is to be noted that the example code snippet of Table 3 illustrates conceptually an embodiment of an instrumentation process, though actual instrumentation results may differ.

TABLE 3

Example Closure With Instrumentation

| | |
|---|---|
| L300 | static void Main(string[ ] args) { |
| L301 | FuncWithClosure( ); |
| L302 | } |
| L303 | static void FuncWithClosure( ) { |
| L304 | int varA, varB; |
| L305 | Closure closure = RuntimeHelpers.CreateClosure(ref varA, ref varB); |
| L306 | try { |
| L307 | varA = 100; |
| L308 | varB = 200; |
| L309 | Func<int> lambda = RunTimeHelpers.CreateLambdaWithClosure(closure, myClosure => { |
| L310 | return (int)myClosure.GetVariable(0) + (int)myClosure.GetVariable(1); |
| L311 | }); |
| L312 | varA = 150; |
| L313 | LambdaInvoker(lambda); |
| L314 | } |
| L315 | finally { |
| L316 | RuntimeHelpers.DeleteClosure(closure); |
| L317 | } |
| L318 | } |
| L319 | static void LambdaInvoker(Func<int> lambda) { |
| L320 | int result = lambda( ); |
| L321 | } |

As illustrated in Table 3, in one embodiment a runtime helper object is used to perform operations that implement a closure. For example, line L305 illustrates an instrumented call to a runtime helper function that creates a closure object, passing to it the address of each local variable that will be closed. At line L316, a matching instrumented call to a helper function that deletes the closure object is inserted, prior to exiting of the outer function. The body of the outer function, FuncWithClosure( ) is placed within a "try" clause (line L306), and the instrumented call to delete the closure is placed within a "finally" clause (line L315), so that the closure object is deleted even if the function exits due to an exception.

In one embodiment, a helper function is used to create a lambda object. In Table 3, line L309 includes an instrumented call to this helper function. The helper function GetVariable( ) is used to retrieve each closed-over variable. In this example, each variable has an index value, and referencing a variable is performed by passing in the corresponding index value. In this example, closure variables varA and varB have index values 0 and 1, respectively.

In the embodiment illustrated by Table 3, the reference to the closed-over variable varA by the outer function at line 312 is not instrumented. This allows the statement to reference the closed-over variable within the outer function stack frame in a manner similar to that of local variables that are not closed-over.

Figure 2:
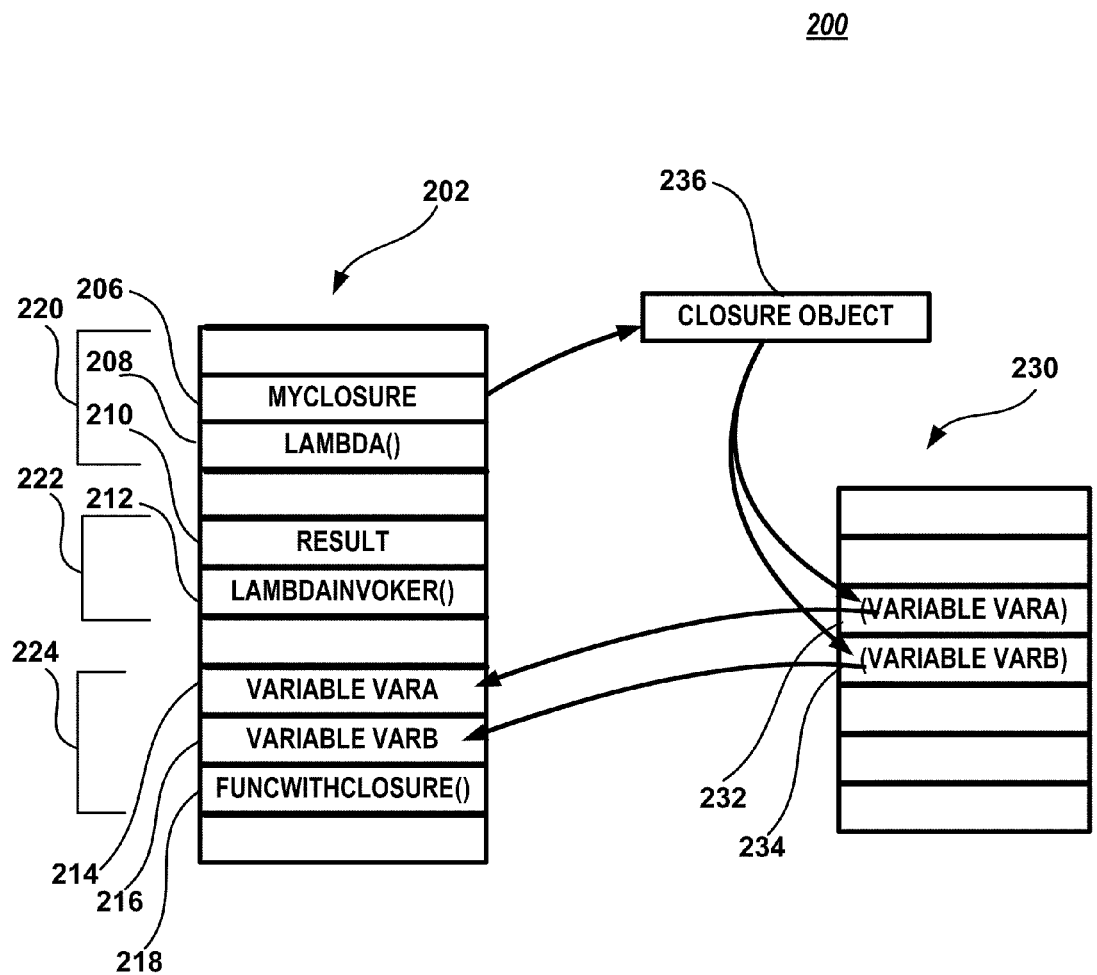
FIG. 2 is a set of data structures that may be used to implement at least some of the mechanisms described herein.

FIG. 2 is a block diagram of data structures 200 that may be employed to implement a mechanism for processing the example code snippet of Table 2. As discussed above, in one embodiment, the code snippet of Table 2 may be instrumented as conceptually represented by the code snippet of Table 3. FIG. 2 corresponds to the instrumented code snippet of Table 3.

In FIG. 2, data structures include run-time stack 202, stack pointer table 230, and closure object 236. Run-time stack 202 contains stack entries 206-218. Each stack entry belongs to a stack frame corresponding to an instance of an active function. In the example of FIG. 2, stack entries 214, 216, and 218 belong to stack frame 224, which corresponds to an instance of FuncWithClosure( ) stack entries 210 and 212 belong to stack frame 222, which corresponds to an instance of LambdaInvoker( ) stack entries 206 and 208 belong to stack frame 220, which corresponds to an instance of Lambda( ) A run-time stack may include more or fewer stack frames, and more or fewer stack entries, though the illustrated entries serve to illustrate aspects of at least some mechanisms described herein.

As illustrated, stack frame 224 includes stack entry 214 containing data of variable varA, stack entry 216 containing data of variable varB, and stack entry 218, containing other data of FuncWithClosure( ) Stack frame 222 includes stack entry 212 containing data of variable result, and stack entry 212, containing other data of function LambdaInvoker( ) Stack frame 220 includes stack entry 206 containing lambda object "myClosure," which points to closure object 236 and is used to reference the closed-over variables varA and varB Stack pointer table 230 contains data corresponding to elements within each closure. Specifically, stack pointer entry 232 contains a pointer to stack entry 214 (varA), and stack pointer entry 234 contains a pointer to stack entry 216 (varB).

In the illustrated embodiment, closure object 236 is associated with the closure of FuncWithClosure( ) and with the lambda function. It includes pointers to the stack pointer entries 232 and 234, corresponding to respective closure variables varA and varB.

In the following discussion, references to lines of Table 3 are used to designate a correspondence between operations and the instrumented code of Table 3. One embodiment operates in the following manner. During runtime, when an instance FuncWithClosure( ) is entered and a corresponding frame 224 is pushed onto runtime stack 202, a runtime helper function to create a closure is invoked (line L305). Stack pointer entries 232 and 234 are added to stack pointer table 230, each entry containing a pointer to the stack entry 214 or 216, respectively, corresponding to the local variable of the closure. Also, closure object 236 is created, with pointers to the stack pointer entries 232 and 234. In one embodiment, the lambda may be created by invoking a helper function (line L309). The resulting lambda is bound to the closure object 236, which causes the closure object 236 to be passed to the lambda (as the "myClosure" argument in this example) when the lambda is invoked.

When the lambda function is subsequently invoked, such as at line L320, the closure object 236 is used to retrieve the values of variables varA and varB from stack entries 214 and 216, respectively. This may be performed by using the variable indices in the closure object, retrieving the respective pointers from stack pointer entries 232 and 234, and following the stack pointers to the stack entries. Thus, though the semantics of a closure are followed, the data of the local variables varA and varB are maintained on the runtime stack 202 rather than in a block of heap memory. In some configurations, this mechanism may avoid garbage collection of heap memory with respect to closure variables, and reduce execution time or other use of various resources.

Though FIG. 2 illustrates a single lambda function, in a program having multiple instances of lambda functions referencing the closed-over variables varA and varB, in one embodiment each instance may have a lambda object that points to closure object 236, so that each reference accesses the same corresponding variable on runtime stack 202. This may occur, for example, if the lambda function at lines L207-L208 of Table 2 invoked a second lambda function, and both lambda functions were active with corresponding stack frames. In another example, it may occur if multiple instances of one or more lambda functions are invoked sequentially, so that one instance is removed from the runtime stack prior to the second instance being pushed onto the stack.

Figure 3:
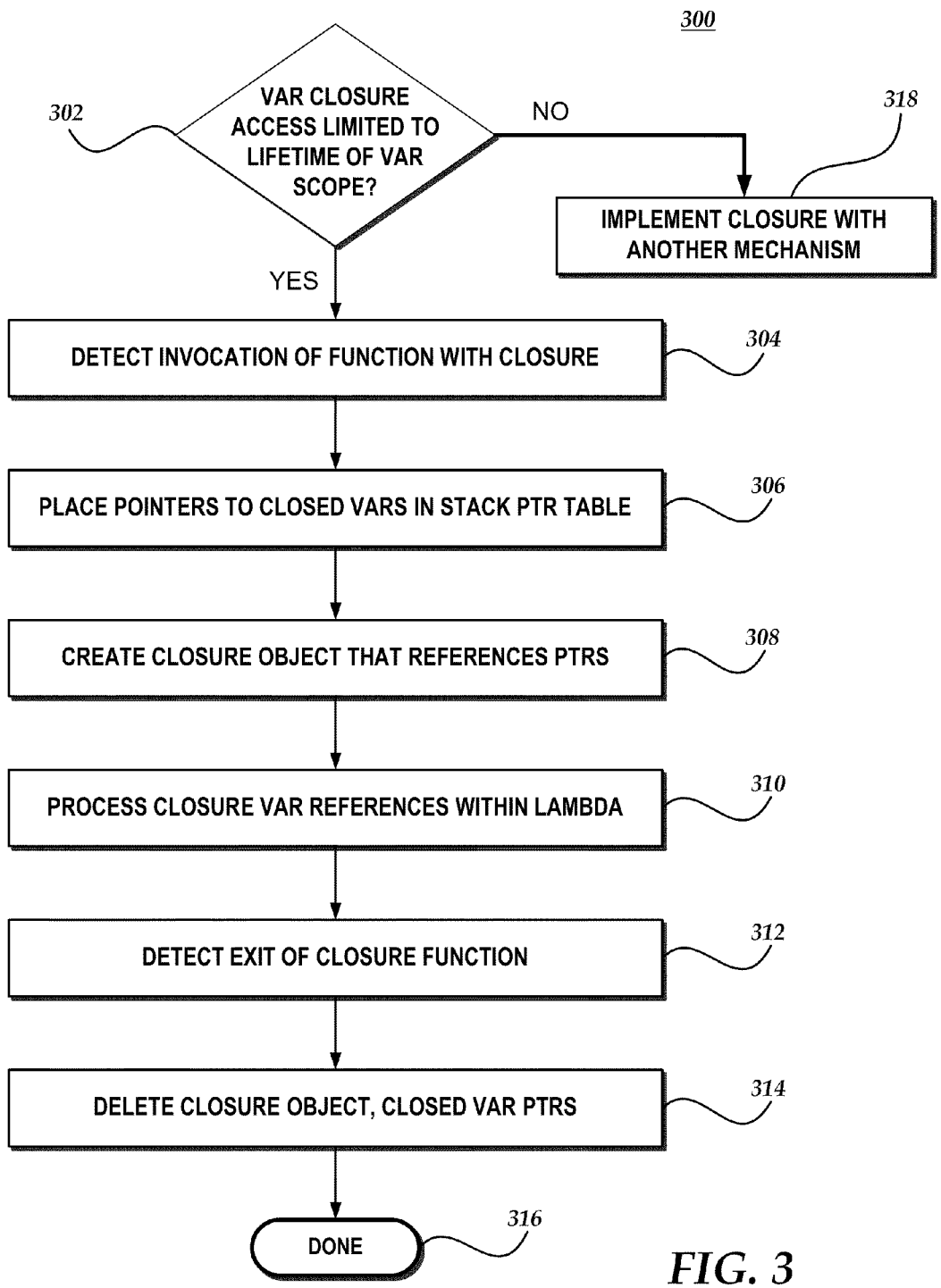
FIG. 3 is a flow diagram illustrating an example embodiment of a process of implementing variable closure.

FIG. 3 is a flow diagram illustrating an example embodiment of a process 300 of implementing variable closure. In one embodiment, some of the actions of process 300 are performed by components of computer system 100 of FIG. 1.

The illustrated portions of process 300 may be initiated at decision block 302, where a determination may be made of whether access to variables of a closure is limited to the lifetime of the variable's scope. In one embodiment, the determination of decision block 302 may be made manually, for example, by a programmer who is developing program code. In one embodiment, the determination may be made automatically, such as by a computer program that analyzes the program code to determine if the proper conditions are met.

If, at decision block 302, the determination is negative, the process may flow to block 318, where mechanisms other than that described herein is employed to implement the closure. The process may exit or return to a calling program.

If, at decision block 302, the determination is affirmative, the process may flow to block 304, where invocation of a function with variable closure is detected. This function is referred to herein as the "outer" function or the closure function. As discussed herein, in one embodiment, the actions of block 304 may include the use of a helper function that is invoked by instrumented program code inserted to indicate when the outer function is invoked.

The process may flow to block 306, where pointers to variables of the closure are placed in a specified location. One such location may be a stack pointer block, such as stack pointer table 230 of FIG. 2. One implementation may include an entry for each closed-over variable of each closure.

The process may flow to block 308, where a closure object corresponding to the outer function closure is created, such that the closure object references the pointers described for block 306. Various implementations may include a single reference to the set of closed-over variable pointers of the closure, and a corresponding configuration that enables location of each closed-over variable pointer. Some implementations may include multiple references from the closure object to the stack pointer table.

The process may flow to block 310 where one or more closure variable references within a lambda function are processed, to associate each reference with a corresponding closed-over variable on the runtime stack. Actions of block 310 are illustrated in FIG. 4, and discussed in further detail herein.

The process may flow to block 312, where the exit of the outer closure function is detected. As discussed herein, this may be facilitated by the instrumentation of the program code to include a helper function call prior to the exit of the outer closure function. In response to this detection, the process may flow to block 314, where the closure object may be deleted, and the closed-over variable pointers may be removed from the stack pointer table. It is to be understood that deletion, as used herein, may be implemented in a variety of ways, including marking a block to be deleted by a subsequent process.

The process may flow to done block 316, and exit or return to a calling program. The process 300 of FIG. 3 may be performed one or more times concurrently or sequentially, for multiple closures.

Figure 4:
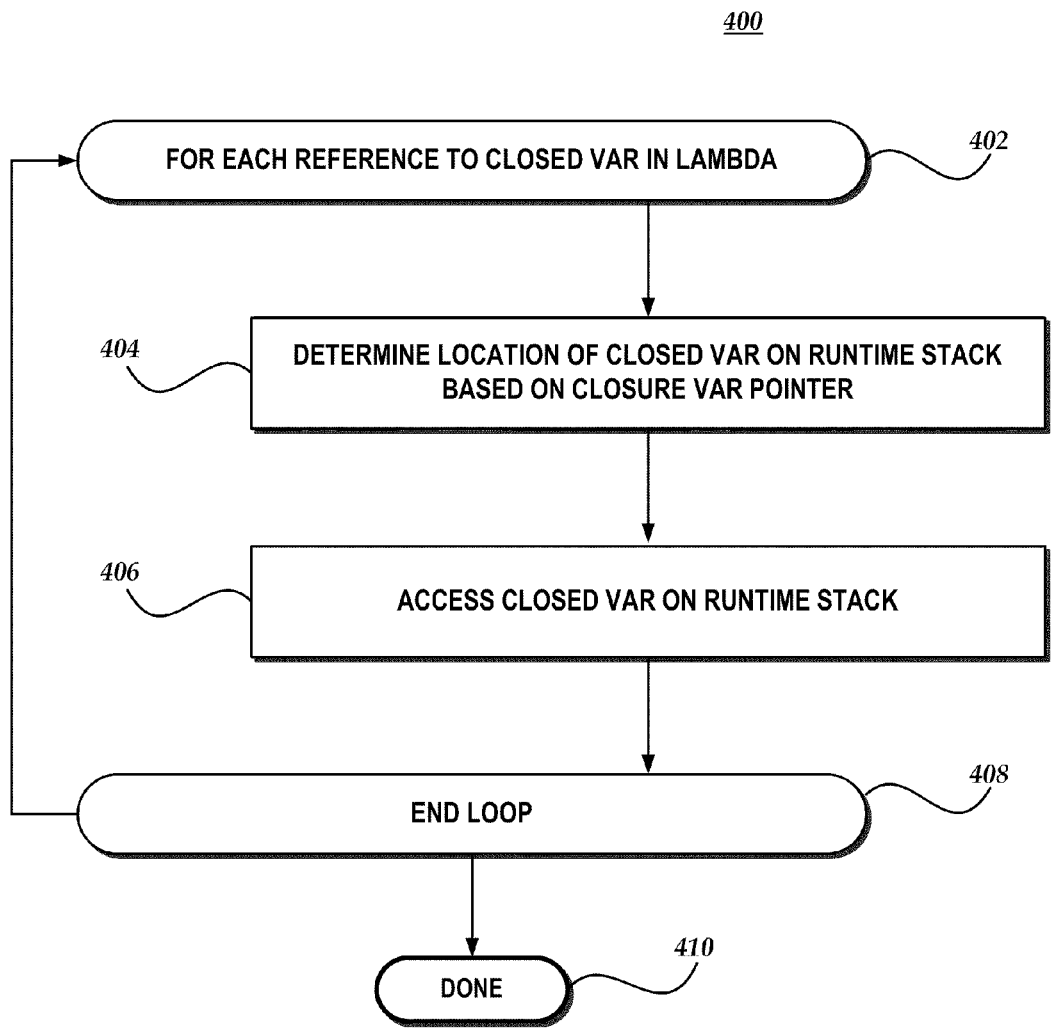
FIG. 4 is a flow diagram illustrating an example embodiment of a process of processing closure variable references in a lambda function.

FIG. 4 is a flow diagram of a process 400 for processing closure variable references in a lambda function. In one embodiment, process 400, or a variation thereof, may implement at least a portion of the actions of block 310 of FIG. 3.

Process 400 may begin at loop 402, which iterates for each reference to a closed-over variable. For example, line L208 of Table 2 contains references to closed-over variables varA and varB. In one embodiment, loop 402 may iterate once for variable varA and once for variable varB. In an embodiment in which the lambda of line L207 is invoked multiple times, loop 402 may iterate twice for each invocation. In the illustrated embodiment, loop 402 includes blocks 404 and 406, and is terminated at block 408.

At block 404, the location on the runtime stack of the closed-over variable is determined, based on the closure variable pointer and the closure object. Referring to the example structures of FIG. 2, in one implementation, the location of variable varA on the runtime stack is indicated as stack entry 214. Closure object 236 may be used to locate stack pointer entry 232, which is the closure variable pointer for variable varA.

The process may flow to block 406, where the closed-over variable on the runtime stack is accessed. The access may be a read access or a write access. In the example of line L208 of Table 2, the value of variable varA is retrieved during one iteration of loop 402, and the value of variable varB is retrieved during another iteration of loop 402. Some computer programs may include instructions to store a value in a closed-over variable. In such a case, the actions of block 406 may include storing the value in the closed-over variable on the runtime stack.

The process may flow to block 408, which terminates loop 402. After the last iteration of loop 402, process 400 may flow to done block 410, and return to a calling program, such as process 300 of FIG. 3.

Figure 5:
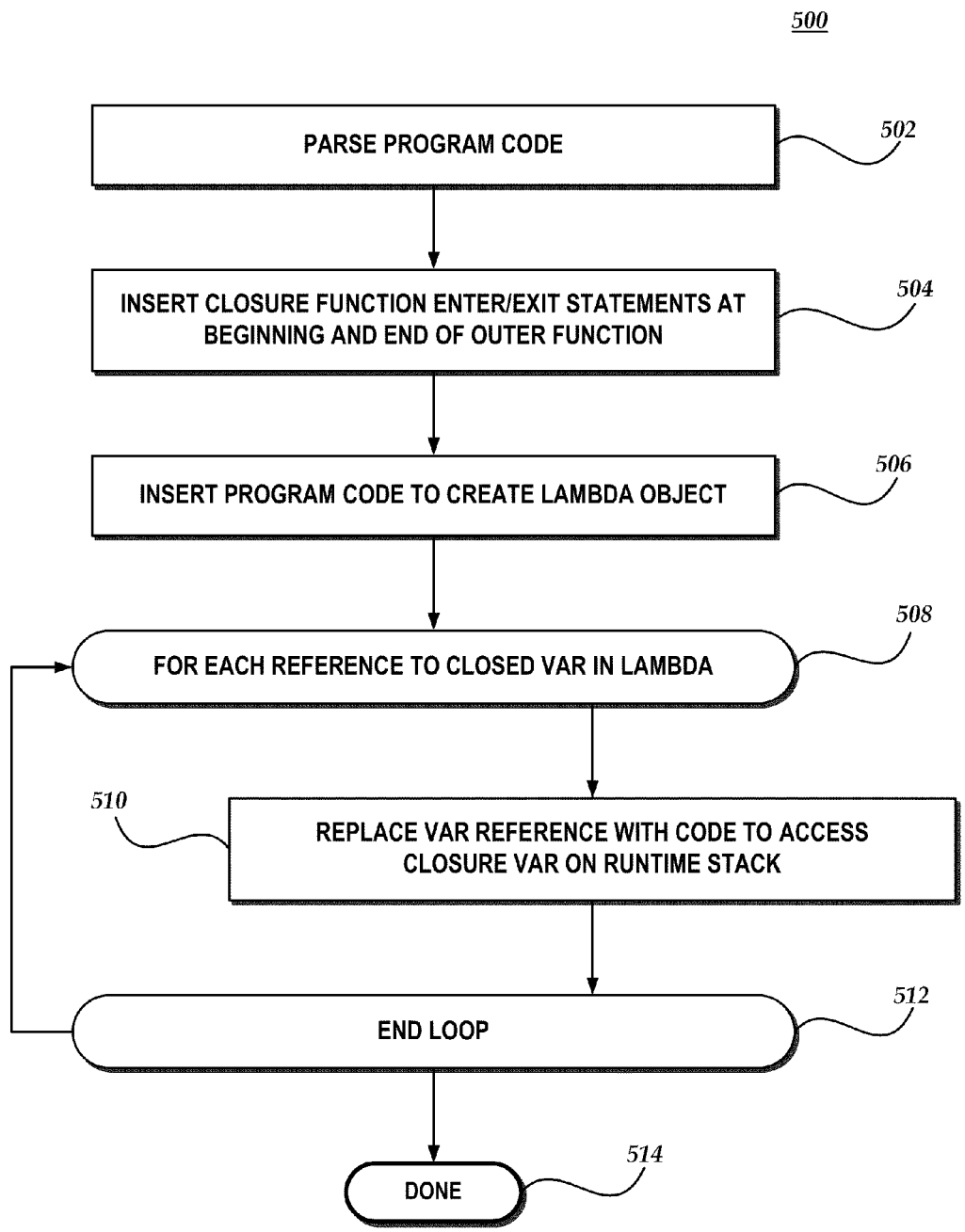
FIG. 5 is a flow diagram of a process for instrumenting program code to facilitate the processes of FIGS. 3 and 4.

FIG. 5 is a flow chart illustrating a process 500 of instrumenting program code to facilitate processes 300 and 400. In one implementation, the program code is instrumented by inserting calls to helper functions that facilitate mechanisms described herein.

The illustrated portion of process 500 may begin at block 502 by parsing the program code. The program code may be in the form of source code, an intermediate language, or native code. This may include determining an entrance or exit location of a closure function, locations of lambda functions, or references to closed-over variables. Though the action of parsing is shown in block 502, in various implementations, parsing the program code may be performed in portions, in conjunction with the other actions of process 504. Thus, each of the illustrated blocks of FIG. 5 may include some parsing of program code or may be preceded by some amount of parsing.

The process may flow to block 504, where statements may be inserted at the beginning and end of the outer closure function, to indicate the invocation and exiting of the function. The statements may include invocations of helper functions to create a closure object or place pointers to the closure variables in a stack pointer table, and to delete this data, as described in process 300. In Table 3, line L305 provides an example of an instrumented function call to create a closure for variables varA and varB. Line L316 provides an example of an instrumented function call to delete the closure, prior to exiting the out function.

The process may flow to block 506, where program code may be inserted to create a lambda object. Line L309 provides an example of an instrumented call to a helper function that creates a lambda object.

The process may flow to loop 508, which begins a loop that iterates for each reference within a lambda object to a closure variable. For example Line L208 of Table 2 includes two such references: a reference to varA and a reference to varB.

The process may flow to block 510, where the variable reference in the current iteration may be replaced with program code to access the closure variable on the runtime stack. In one implementation, this may include a function call to a helper function that performs this action during runtime. Accessing the closure variable may include retrieving the variable value or storing a value in the variable.

The process may flow to block 512, which terminates loop 508. Upon completion of all iterations of loop 508, the process may flow to done block 514, and exit or return to a calling program.

Figure 6:
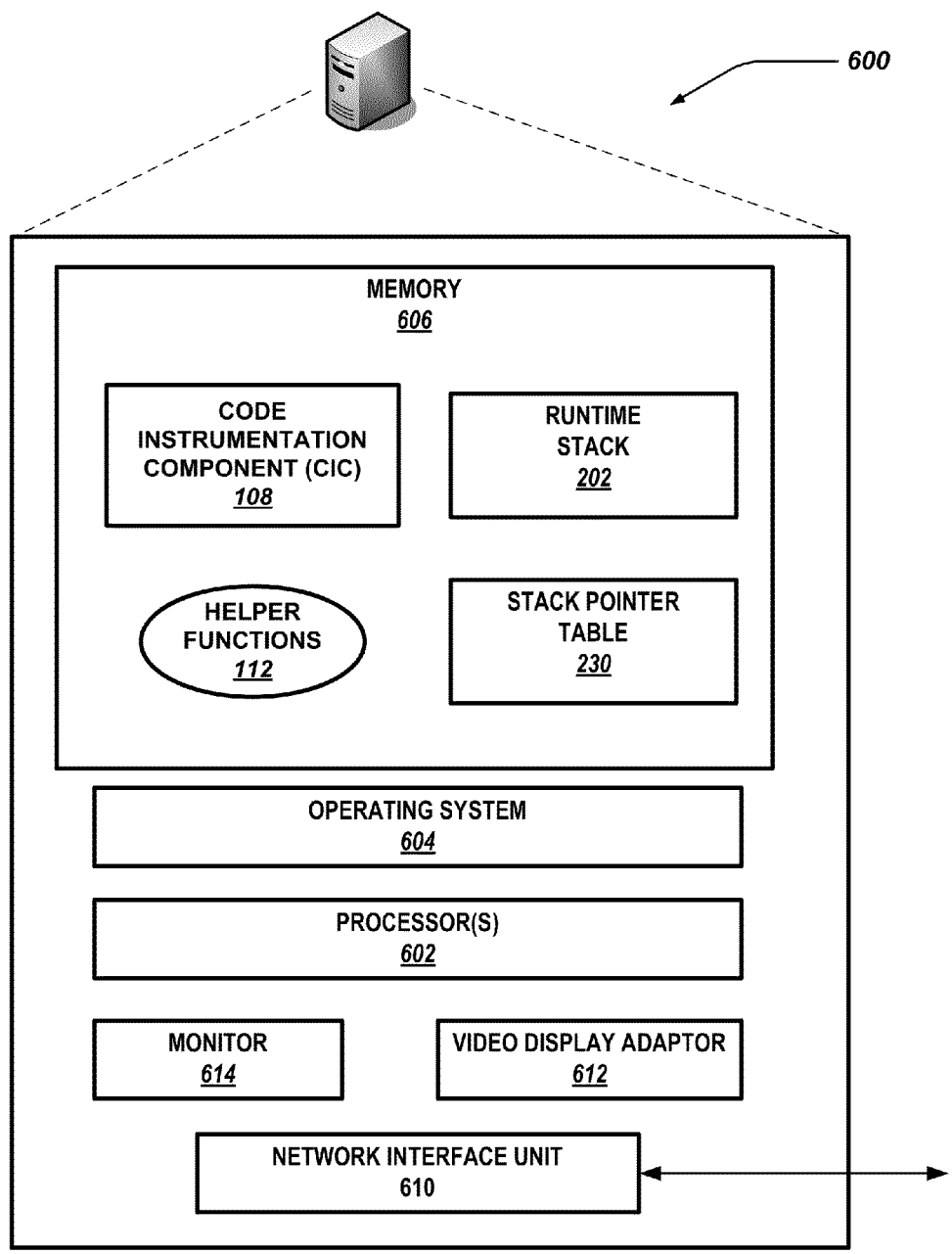
FIG. 6 shows one embodiment of a computing device, illustrating selected components of a computing device that may be used to perform functions described herein.

FIG. 6 shows one embodiment of a computing device 600, illustrating selected components of a computing device that may be used to perform functions described herein, including processes 300, 400, or 500. Computing device 600 may include many more components than those shown, or may include less than all of those illustrated. Computing device 600 may be a standalone computing device or part of an integrated system, such as a blade in a chassis with one or more blades.

As illustrated, computing device 600 includes one or more processors 602, which perform actions to execute instructions of various computer programs. In one configuration, each processor 602 may include one or more central processing units, one or more processor cores, one or more ASICs, cache memory, or other hardware processing components and related program logic. As illustrated, computing device 600 includes an operating system 604. Operating system 604 may be a general purpose or special purpose operating system. The Windows® family of operating systems, by Microsoft Corporation, of Redmond, Wash., are examples of operating systems that may execute on computing device 600.

Memory 606 may include one or more of a variety of types of non-transitory computer storage media, including volatile or non-volatile memory, RAM, ROM, solid-state memory, disk drives, optical storage, or any other medium that can be used to store digital information.

Memory 606 may store one or more components described herein or other components. In one embodiment, memory 606 stores CIC 108, runtime stack 202, helper functions 112, and stack pointer table 230. Any one or more of these components may be moved to different locations in RAM, non-volatile memory, or between RAM and non-volatile memory by operating system 604 or other components.

Computing device 600 may include a video display adapter 612 that facilitates display of localized text strings to a user, or a speech component (not shown) that converts text to audio speech and presents the spoken strings to a user. Though not illustrated in FIG. 6, computing device 600 may include a basic input/output system (BIOS), and associated components. Computing device 600 may also include a network interface unit 610 for communicating with a network. Embodiments of computing device 600 may include one or more of a display monitor 614, keyboard, pointing device, audio component, microphone, voice recognition component, or other input/output mechanisms.

It will be understood that each block of the flowchart illustration of FIGS. 3-5, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of accessing a closure variable defined in a function of a computer program from a lambda expression that is invoked from a computer program location outside the function while an instance of the function is active, the closure variable stored in a frame on a runtime stack, the frame corresponding to the function instance, comprising:
   a) in response to entering the function during program execution, storing a pointer to the closure variable in a data structure;
   b) in response to an instruction to retrieve a value of the closure variable, the instruction in the lambda expression, employing the pointer to locate the closure variable in the frame on the runtime stack and retrieve the variable value;

c) automatically inserting a closure creation instruction to create a closure object in response to an invocation of the function; and d) automatically inserting a variable reference instruction to retrieve the closure variable value from within the lambda expression.

2. The computer-based method of claim 1, further comprising generating a closure object corresponding to the instance of the function; and employing the closure object to locate the pointer.

3. The computer-based method of claim 1, further comprising in response to an instruction to assign a value to the closure variable, the instruction in the lambda expression, employing the pointer to locate the closure variable in the frame on the runtime stack and store the value in the closure variable.

4. The computer-based method of claim 1, further comprising automatically inserting one or more instructions into the function to facilitate storing the pointer to the closure variable in response to entering the function during program execution.

5. The computer-based method of claim 1, further comprising automatically inserting one or more instructions into the lambda expression to facilitate employing the pointer to locate the closure variable in the frame on the runtime stack.

6. The computer-based method of claim 1, further comprising, after storing the pointer to the closure variable and prior to employing the pointer to locate the closure variable, modifying the closure variable.

7. The computer-based method of claim 1, further comprising:
   a) providing program code to create the closure object; and
   b) providing program code to retrieve the closure variable value.

8. The computer-based method of claim 1, the function including an instruction that references the closure variable, the method further comprising:
   a) instrumenting the lambda expression to facilitate employing the pointer to locate the closure variable in the frame on the runtime stack; and
   b) not instrumenting the instruction, to allow the instruction to access, without employing the pointer, the closure variable in the frame on the runtime stack.

9. A computer-based system for accessing a closure variable defined in a closure function of a computer program, the system comprising:
   a) a code instrumentation component configured to perform actions, including:
      i. parsing the function and inserting program code to store a pointer to the closure variable in a data structure;
      ii. parsing a lambda function to determine one or more references to the closure variable, and inserting an instruction to access the closure variable, the closure variable stored in a runtime stack frame corresponding to an instance of the function;
   b) a first helper function that performs actions including retrieving the pointer to the closure variable, employing the pointer to locate the closure variable in the runtime stack frame, and retrieving a value from the location of the closure variable;
   c) a second helper function that performs actions including storing the pointer to the program variable; and
   d) a computer readable memory that stores computer instructions for implementing the code instrumentation component.

10. The computer-based system of claim 9, the program code to store a pointer to the closure variable comprises an instruction to invoke the second helper function, the instruction inserted within the function.

11. The computer-based system of claim 9, inserting the instruction to access the closure variable comprising replacing each of the one or more references to the closure variable with an instruction that invokes the first helper function.

12. The computer-based system of claim 9, including means for enabling a lambda expression within the closure function to access the closure variable without creating a copy of the closure variable in heap memory.

13. The computer-based system of claim 9, further comprising program code to create a closure object corresponding to each instance of the function in response to an invocation of the instance of the function, the closure object including a reference for retrieving the pointer to the closure variable.

14. The computer-based system of claim 9, further comprising means for employing the pointer to store another value in the closure variable in the runtime stack frame.

15. The computer-based system of claim 9, further comprising means for enabling a plurality of lambda function instances to access the closure variable in the runtime stack frame.

16. A computer-readable storage memory comprising computer program instructions for enabling a user program to access one or more closure variables stored on a runtime stack, the closure variables local to a closure function, the program instructions executable by one or more processors to perform actions including:
   a) parsing the user program to determine an entrance location of the closure function;
   b) inserting program code into the user program closure function to store a pointer to each of the one or more closure variables stored on the runtime stack;
   c) in response to a detection of an invocation of an instance of the closure function, storing the pointer to each of the one or more closure variables in a data structure; and
   d) in response to an instruction in a lambda function within the closure function for retrieval of a value stored in a closure variable on the runtime stack, retrieving the value stored in the closure variable by using the pointer to the closure variable stored on the runtime stack.

17. The computer-readable storage memory of claim 16, the actions further comprising, in response to the detection of the invocation of the instance of the closure function, creating a closure object corresponding to the instance, the closure object including a reference to the pointer to the closure variable.

18. The computer-readable storage memory medium of claim 16, the actions further comprising, selectively enabling references to the closure variable from a lambda expression to retrieve data from the closure variable on the runtime stack, based on whether the lambda expression retrieves the data from the closure variable while the closure function is active.

19. The computer-readable storage memory of claim 16, the actions further comprising selectively storing another closure variable on the runtime stack based on whether it is to be retrieved while the closure function is active.

20. The computer-readable storage memory of claim 16, the actions further comprising enabling the lambda function to access the closure variable by employing the pointer to the closure variable, and enabling an instruction in the closure function to access the closure variable without employing the pointer to the closure variable.

* * * * *